May 15, 1962     J. B. GODSHALK     3,034,481
POULTRY WATERER
Filed April 15, 1960
FIG.1
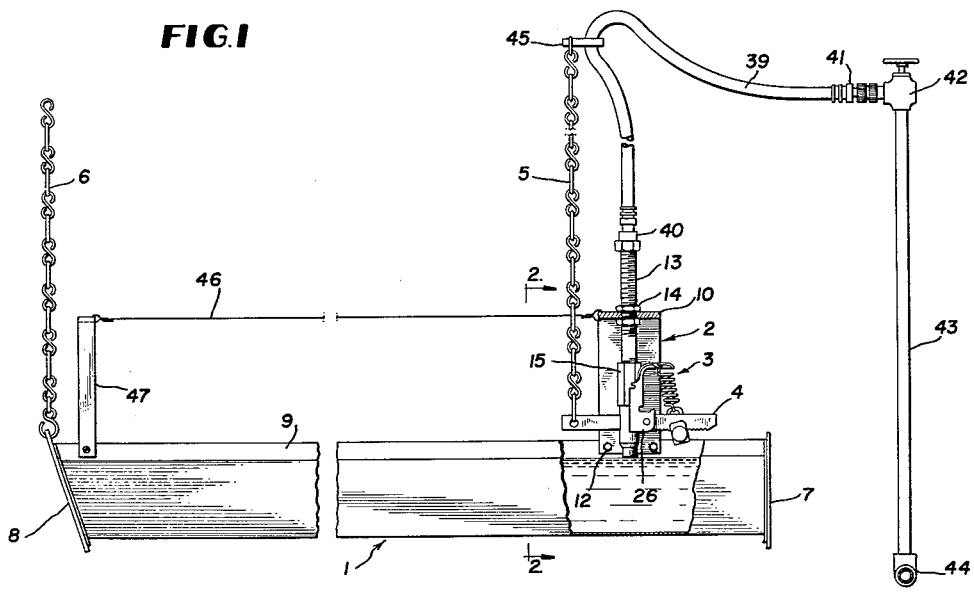
FIG.2
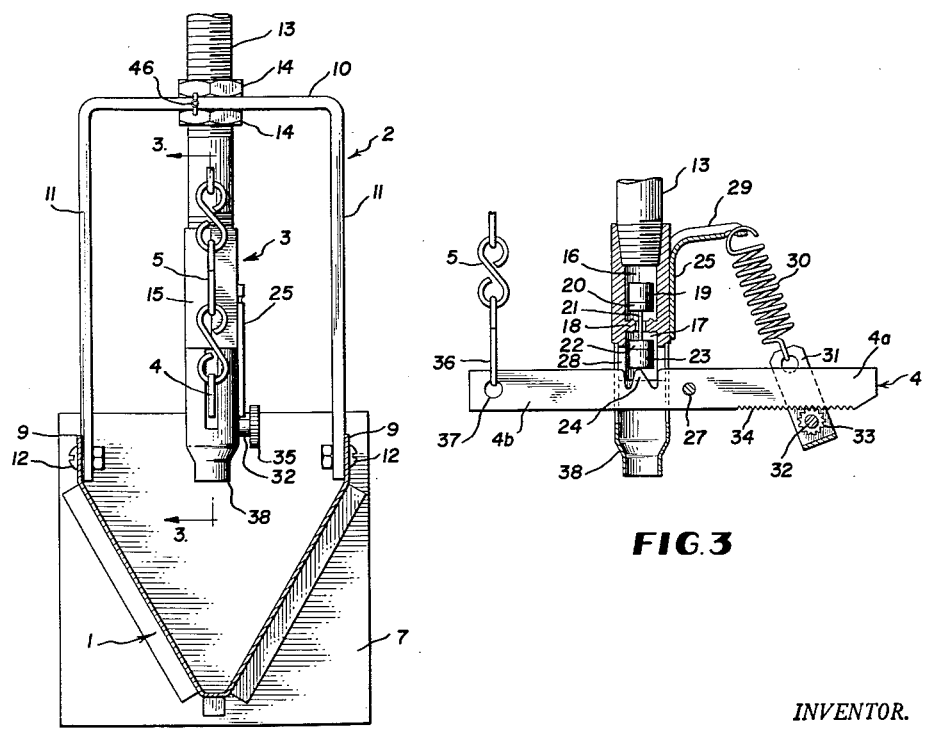
FIG.3
INVENTOR.
JAMES B. GODSHALK
BY D.C.Roylance
ATTORNEY

United States Patent Office 3,034,481
Patented May 15, 1962

3,034,481
POULTRY WATERER
James B. Godshalk, West Pikeland Township, Chester County, Pa., assignor to Fox Products Company, Philadelphia, Pa., a corporation of Pennsylvania
Filed Apr. 15, 1960, Ser. No. 22,434
8 Claims. (Cl. 119—81)

This invention relates to poultry waterers and more particularly to waterers of the type comprising an elongated watering trough equipped with an automatic valve operated in response to the combined weight of the trough and its contents for maintaining a substantially constant water level in the trough.

When waterers of this general type were first adopted by the industry, the usual practice was to pivotally support one end of the trough on the floor of the chicken house, mount the valve in fixed position above the floor, and suspend the other end of the trough from the valve operating member, an example of this arrangement being seen in Reissue Patent 23,447, issued to Pruitt. In more recent times, users have provided a relatively heavy bar extending longitudinally above the top of the trough, one end of the trough being suspended from the bar, the valve being mounted on the bar and the other end of the trough being suspended from the valve operating arm. When this type of arrangement was first used, the bar was supported on two spaced stands. More recently, users have suspended the bar from above, as from the roof or ceiling structure of the building structure in which the waterer is installed, so that support of the waterer is simplified and the height thereof above the floor can be adjusted with ease. In constructions of the type just mentioned, the primary function of the bar has come to be the support of the valve, though the bar also serves to support an anti-roosting device.

Waterers of this type have proved to be highly satisfactory in commercial use. There is, however, a continuing need for simplification of the structure in order to reduce cost.

An object of the present invention is to provide a poultry waterer of the type described wherein the trough is suspended from above and the horizontal bar heretofore used to mount the valve is eliminated.

Another object is to devise an improved and more economical poultry waterer of the suspended trough type.

A further object is to provide a construction of the type described in which the valve is mounted directly on the trough and the trough is suspended via the operating means of the valve.

In order that the manner in which these and other objects are attained, in accordance with the invention, can be understood in detail, reference is had to the accompanying drawings, which form a part of this specification, and wherein:

FIG. 1 is a view mainly in side elevation, with some parts broken away for clarity of illustration, of a poultry waterer constructed in accordance with one embodiment of the invention;

FIG. 2 is a transverse sectional view taken on line 2—2, FIG. 1, with some parts shown in elevation, and FIG. 3 is a detail sectional view taken on line 3—3, FIG. 2, with some parts shown in elevation, FIGS. 2 and 3 being on a larger scale than is FIG. 1.

Referring now to the drawings in detail, it will be seen that the embodiment of the invention chosen for illustration comprises an elongated watering trough 1, a bracket 2 fixedly mounted on the trough at one end thereof, a filling valve 3 mounted on the bracket and including an operating arm 4, a first suspension chain 5 attached to one end of operating arm 4, and a second suspension chain 6 attached to trough 1 at the end thereof opposite bracket 2.

Trough 1 may be of any conventional type, though the invention is most advantageous for use with troughs which by themselves constitute a relatively rigid structure, as compared to the extremely long troughs sometimes employed in poultry waterers. Thus, trough 1 can be a sheet metal trough 5–10 feet in length and of generally V-shaped transverse cross-section, the end of the trough adjacent bracket 2 being closed in water-tight fashion by a plate 7 and the opposite end being similarly closed by an inclined plate 8, plate 8 slanting downwardly toward the opposite end of the trough. Advantageously, the side walls of the trough are provided with narrow, parallel top edge portions 9, as will be clear from FIG. 2.

Formed of a single piece of sheet metal, bracket 2 has the form of an inverted U, so as to include a flat top portion 10 and a pair of spaced, parallel legs 11 depending therefrom, the tip portion of each leg 11 overlying the outer face of a different one of the top edge portions 9 of the trough side walls and being rigidly attached thereto, as by bolts 12. Top portion 10 of the bracket is provided with a circular opening centered above the trough, and a relatively short length of water supply pipe 13 extends vertically through this opening. Pipe 13 is exteriorly threaded at each end and over an intermediate portion. A pair of clamping nuts 14 are threadedly engaged on the intermediate portion of pipe 13 and are arranged each on a different side of bracket portion 10, the latter being firmly clamped between nuts 14 so that the pipe is rigidly mounted on the bracket.

The valve 3 includes an upright valve body 15 having a cylindrical bore divided into an upper chamber 16 and a lower chamber 17 by an integrally formed internal transversely extending partition 18 which, as later described, provides the upper and lower valve seats of a double acting valve means. The top of body 15 is internally threaded and the lower tip of pipe 13 is threadedly engaged therein, as seen in FIG. 3, so that the valve body 15 is rigidly attached to pipe 13 and, therefore, to bracket 2.

In upper chamber 16 of the valve, there are provided a weight 19 and, between the weight and partition 18, a movable valve element 20 in the form of a circular body of suitable nonmetallic material. Partition 18 is provided with a central opening through which extends a pin 21, the diameter of the pin being materially less than that of the opening so as to afford space for water to flow from chamber 16 into chamber 17. In lower chamber 17, there are provided a movable valve element 22, identical to element 20, and a weight 23 disposed below element 22 and resting upon a rounded portion 24 provided on the upper edge of operating arm 4.

Secured rigidly to the side of valve body 15 facing toward plate 7 is a bracket 25 formed of substantially rigid sheet metal stock and including a vertical ear 26, FIG. 1. Arm 4 is pivoted on ear 26 by a pivot pin 27. Arm 4 extends through diametrically aligned vertical slots 28, FIG. 3, in the valve body and includes a portion 4a projecting away from the valve body on the side of the body where ear 26 is located, and a portion 4b projecting away from the valve body on the opposite side thereof. Above arm 4, bracket 25 includes a fixed arm 29 which projects laterally from the valve body and is provided at its tip with an opening in which is hooked the upper end of a helical biasing spring 30. The lower end of spring 30 is connected to portion 4a of the operating arm by adjustable means comprising a bracket 31 having the configuration of a J, the spring being hooked in an aperture provided in the tip of the long arm of the J, as seen in FIG. 3.

The bottom of the J of bracket 31 embraces the operating arm and extends therebelow. A rotatable shaft 32, disposed below arm 4, is bearinged in the two arms of the J and has fixed thereto a pinion 33. The lower edge of portion 4ª of the operating arm is toothed, as at 34, to provide a rack portion with which the pinion 33 is operatively meshed. As will be clear from FIG. 2, shaft 32 projects beyond the short arm of bracket 31 and is provided with a knurled adjusting knob 35. Any suitable means is provided to restrain pinion 33 frictionally against rotation so that the pinion travels the rack portion only when knob 35 is turned.

Spring 30 is thus effective to bias portion 4ª of the operating arm upwardly, the effective point of connection of the spring to the arm, and thus the magnitude of the biasing action, being adjustable by manual rotation of knob 35 to cause pinion 33 to travel along rack portion 34, carrying bracket 31 and the lower end of spring 30 along the operating arm in accordance with the direction and extent of rotation of knob 35.

Suspension chain 5 is provided at its end with a suitable hook 36, FIG. 3, engaged in an opening 37 in the tip of portion 4ᵇ of the valve operating arm. Accordingly, when the trough, carrying bracket 2 and valve 3, is suspended by chains 5, 6 in the manner seen in FIG. 1, the combined weight of the waterer and the water contained therein tends to cause portion 4ᵇ of the valve operating arm to move upwardly, against the biasing action of spring 30. Such pivotal movement of arm 4, if of sufficient extent, will cause the movable elements 19, 20, 21, 22, 23 of the valve to be shifted upwardly until element 22 engages the valve seat provided by the lower surface of partition 18. On the other hand, a decrease in the amount of water in the trough 1 will allow spring 30 to pivot arm 4 in the opposite direction, allowing element 22 to move downwardly away from the partition 18, so that water can flow through the valve into the trough. If, for any reason, the weight of the waterer is not applied to the valve operating arm, spring 30 is effective to pivot portion 4ª of the arm upwardly to such an extent that the upper valve element 20, urged downwardly by water pressure, moves into engagement with the valve seat afforded by the upper surface of partition 18, so that the flow of water through the valve is terminated.

A tubular nozzle 38, suitably slotted to accommodate arm 4, is telescoped over the bottom end portion of valve body 15 and is effective to direct water from valve 3 into trough 1.

The upper threaded end of pipe 13 is connected to one end of a flexible hose 39, FIG. 1, by a conventional female hose coupling 40. The other end of the hose is equipped with a female coupling 41 connected to the outlet of a manual shut-off valve 42, the valve 42 being connected to control flow of water from a vertical pipe 43. Pipe 43 is connected to a T coupling 44 in a horizontally extending water pipe employed to supply a plurality of waterers of the type here described. Hose 39 is attached to suspension chain 5 by a suitable tie ring 45, in such fashion that there is a loop of hose between ring 45 and coupling 40 to allow relative vertical movements between chain 5 and valve 3.

A simple length of wire or the like 46 extends longitudinally above the trough as an anti-roosting device, the ends thereof being attached in any suitable fashion respectively to a bracket 47 and bracket 2.

It is to be understood that the embodiment of the invention herein shown and described is illustrative and that various changes and modifications can be made without departing from the scope of the invention as defined in the appended claims.

I claim:

1. In a poultry waterer, the combination of a watering trough; a filling valve mounted on said trough and constructed and arranged to supply water thereto in accordance with the amount of water in the trough, said valve including a pivoted operating member and resilient means biasing said operating member toward a valve-closing position; supply conduit means connected to said valve to supply water thereto, said conduit means permitting vertical movement of said valve; and means for suspending the combination of said trough and valve, said last-mentioned means comprising a first support member attached to said pivoted operating member and a second support member attached to said trough at a point spaced longitudinally from said valve, the weight of said trough tending to move said operating member in opposition to said resilient means when the combination of said valve and said trough is suspended from said support members.

2. In a poultry waterer, the combination of an elongated watering trough; bracket means attached to said trough at one end thereof and projecting upwardly therefrom; a filling valve mounted on said bracket means and constructed and arranged to supply water to said trough in accordance with variations in the amount of water in the trough, said valve including a pivoted operating lever and a spring connected to said lever to bias the same to a valve-closing position; means for suspending the combination of said trough and valve, said last-mentioned means comprising a first suspension member attached to said lever and a second suspension member attached to said trough at the end thereof opposite said bracket means, the weight of said trough tending to move said lever against the biasing effect of said spring when said trough is suspended from said suspension members; and means for supplying water to said valve.

3. In a poultry waterer in accordance with claim 2 and wherein said bracket means includes a horizontal member disposed above said trough and provided with an opening, said valve includes an upright valve body, and said means for supplying water includes a rigid tubular member rigidly connected to said valve body and extending through said opening, said tubular member being exteriorly threaded, said waterer further comprising nut means carried by the threaded portion of said tubular member and arranged to fix said tubular member to said horizontal member.

4. A poultry waterer in accordance with claim 2 and wherein said valve includes an upright valve body and said pivoted operating lever extends transversely with respect to said body and includes portions projecting each from a different side of said body, said spring being connected to one of said portions to bias the same upwardly and said first suspension member being attached to the other of said portions.

5. In a poultry waterer, the combination of an elongated watering trough; a bracket fixed to said trough at one end thereof and projecting upwardly therefrom; an upright conduit rigidly mounted on said bracket and projecting downwardly toward said trough; a filling valve mounted on the lower end of said conduit and constructed and arranged to supply water from said conduit to said trough in accordance with variations in the amount of water in the trough, said valve including an operating member mounted for movement about a horizontal axis and a spring connected to said operating member to bias the same toward a valve-closing position; and means for suspending the combination of said trough and valve, said last-mentioned means comprising a first suspension member attached to said operating member and a second suspension member attached to said trough at the end thereof opposite said bracket, the weight of said trough and the water therein tending to move said operating member against the biasing effect of said spring when said trough is suspended from said suspension members.

6. A poultry waterer in accordance with claim 5 and further comprising a flexible water supply hose connected to the upper end of said conduit, said hose being attached to said first suspension member at a point above said valve, there being sufficient slack in said hose to allow the said valve to move vertically relative to said first suspension member.

7. In a poultry waterer, the combination of an elongated watering trough; bracket means attached to said trough at one end thereof and projecting upwardly therefrom; a filling valve mounted on said bracket means and constructed and arranged to supply water to said trough in accordance with variations in the amount of water in the trough, said valve including an upright valve body defining an upper chamber and a lower chamber separated by intermediate valve seat means, a first movable valve member disposed in said upper chamber, a second movable valve member disposed in said lower chamber, means interconnecting said movable valve members for simultaneous operation, an operating arm extending transversely of said valve body below said second movable valve member and supporting the latter, said arm being pivoted for movement about a horizontal axis spaced laterally from the central axis of said valve body and including first and second arm portions projecting away from said valve body on opposite sides thereof, and a spring connected to one of said arm portions to bias the same upwardly; a first suspension member attached to the other of said arm portions, and a second suspension member attached to said trough at the end thereof opposite said bracket means, the weight of said trough and the water therein tending to move said arm against the biasing effect of said spring when said trough is suspended from said suspension members.

8. In a poultry waterer, the combination of a watering trough; a weight-operated filling valve rigidly mounted on said trough and constructed and arranged to supply water to the trough in accordance with the combined weight of the trough and the water therein, said valve comprising movable valve means, a pivoted operating member for actuating said movable valve means to open and close the valve, and a spring connected to said operating member to bias the same toward a given position; supply conduit means connected to said valve to supply water thereto, said conduit means permitting bodily movement of said valve; and means for suspending the combination of said trough and valve from an overhead support, said last-mentioned means comprising a first suspension member attached to said operating member and a second suspension member attached to said trough at a point spaced longitudinally from said valve, the weight of said trough tending to move said operating member in opposition to said spring when the combination of said trough and valve is suspended by said suspension members.

References Cited in the file of this patent
UNITED STATES PATENTS

| | | |
|---|---|---|
| 1,878,817 | Buehrer | Sept. 20, 1932 |
| 2,716,423 | Landgraf | Aug. 30, 1955 |
| 2,806,671 | Hobbs | Sept. 17, 1957 |
| 2,821,167 | Gilbertson | Jan. 28, 1958 |
| 2,827,015 | Williams | Mar. 18, 1958 |